United States Patent
Ohkoshi et al.

(10) Patent No.: US 7,354,958 B2
(45) Date of Patent: Apr. 8, 2008

(54) PHOTOPOLYMERIZABLE COMPOSITION AND FLAME-RETARDANT RESIN-FORMED ARTICLE

(75) Inventors: Masayuki Ohkoshi, Minamiashigara (JP); Hitoshi Okazaki, Minamiashigara (JP); Takuro Hoshio, Minamiashigara (JP); Michiaki Yasuno, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 232 days.

(21) Appl. No.: 11/195,703

(22) Filed: Aug. 3, 2005

(65) Prior Publication Data

US 2006/0217479 A1  Sep. 28, 2006

(30) Foreign Application Priority Data

Mar. 25, 2005  (JP) .............................. 2005-089916

(51) Int. Cl.
C08F 2/46 (2006.01)
C09K 21/00 (2006.01)
C09K 21/06 (2006.01)

(52) U.S. Cl. .................. 522/81; 522/74; 522/90; 522/96; 522/99; 522/150; 522/151; 522/152; 428/411.1; 428/423.1; 428/457; 252/601; 252/609

(58) Field of Classification Search .................. 522/71, 522/74, 81, 90, 96, 150, 151, 152; 428/411.1, 428/423.1, 457; 252/601–609
See application file for complete search history.

(56) References Cited

U.S. PATENT DOCUMENTS 4,405,425 A * 9/1983 Schiller et al. .............. 524/437
7,195,857 B2 * 3/2007 Tamura et al. .............. 430/280.1
2003/0204006 A1 * 10/2003 Moriuchi et al. ............ 524/436
2005/0192392 A1 * 9/2005 Kim et al. ................... 524/436
2005/0201713 A1 * 9/2005 Sato ........................... 385/143
2005/0261412 A1 * 11/2005 Bandou et al. .............. 524/442
2005/0282018 A1 * 12/2005 Van Den Bergen et al. 428/426
2006/0214143 A1 * 9/2006 Okoshi et al. ............... 252/609

FOREIGN PATENT DOCUMENTS

| JP | 52-030262 |  | 3/1977 |
| JP | 57-145006 | A | 9/1982 |
| JP | 61-268763 | A | 11/1986 |
| JP | 10-036682 | A | 2/1998 |
| JP | 2003-253266 | A | 9/2003 |
| JP | 2004-131632 | A | 4/2004 |

OTHER PUBLICATIONS

Masayuki Ohkoshi, "Production of Novel Organic-Inorganic Nano Composite and Analysis of Its Flame-Retarding Characteristics.," Doctoral Thesis, Kyoto Institute of Technology, No. kou-305, Feb. 18, 2004 (Kyoto, Japan) w/abstract.

* cited by examiner

Primary Examiner—Sanza L. McClendon
(74) Attorney, Agent, or Firm—Oliff & Berridge, PLC (57) ABSTRACT

The invention provides a photopolymerizable composition comprising: flame-retardant particles which contains a hydrated metal and have an average diameter of about 1 to 500 nm; and a photopolymerization reactive material. The hydrated metal preferably includes at least one selected from the group consisting of a hydrated magnesium, hydrated calcium, hydrated aluminum, hydrated zinc, hydrated barium, hydrated copper and hydrated nickel. A cover layer which comprises an organic compound or a polysilicone is preferably formed on surfaces of the flame-retardant particles. The invention provides a flame-retardant resin-formed article which is formed of the photopolymerized photopolymerizable composition. A flame retardancy of the article measured in accordance with the UL-94 test preferably scores HB or higher.

14 Claims, 1 Drawing Sheet

PHOTOPOLYMERIZABLE COMPOSITION AND FLAME-RETARDANT RESIN-FORMED ARTICLE

CROSS-REFERENCE TO RELATED APPLICATION

This application claims priority under 35 USC 119 from Japanese Patent Application No. 2005-89916, the disclosure of which is incorporated by reference herein.

BACKGROUND OF THE INVENTION

1. Field of Invention

The present invention relates to a photopolymerizable composition in which flame-retardant particles are mixed with a photopolymerizable monomer, and a flame-retardant resin-formed article comprising the same. Specifically, the invention relates to a photopolymerizable composition excellent in flame-retardancy, water repellency, oil repellency, heat resistance, environmental resistance, and photopolymerizability, and a flame-retardant resin-formed article comprising the same.

2. Description of the Related Art

In recent years, broadband services such as high speed Internet has become widespread in the information industry. In order to respond to the rapid increase in information capacity required by each home, expectations are rising for optical communications, particularly optical fiber.

Considering the development of WDM (Wavelength Division Multiplexing), optical fiber core wire is most promising to be used as an optical fiber for Fiber to the Home (FTTH), a plan for introducing optical fiber to home terminals, which is scheduled to be laid from now on. As a conventional optical fiber core wire, an optical fiber core wire composed of an optical fiber (glass core wire or polymer core wire), a primary covering material (primary) and a secondary covering material (secondary) having a urethane structure and which cover an optical fiber, and a flame-retardant polyethylene covering material (jacket) constituting an outermost layer has been known.

However, an outermost layer having only a flame-retardant polyethylene jacket is insufficient for flame retardancy of an optical fiber. In addition, conventional primary and secondary covering materials having a urethane structure are extremely inferior in flame retardancy and weather resistance. For this reason, from the viewpoint of flame retardancy and weather resistance, it is difficult to apply currently used optical fiber to FTTH, and a substitute therefor has been demanded. In addition, requirements on flame retardancy and weather resistance are stringent for application in aircrafts and vehicles.

With ever increasing demand for optical fiber, there is an urgency to improve the properties thereof, including flame retardancy, and development has been carried.

As a flame-retardant used for the purpose of making a resin flame-retardant by mixing into the resin, a halogen-based compound, antimony trioxide, a phosphorus-based compound, and a hydrated metal compound (metal hydrate) have previously been used. However, the halogen compound and antimony trioxide are being eliminated due to environmental problems, while the hydrated metal compound is suitable because it can reduce the impact on the environmental, and is also excellent from the viewpoint of resin recycling.

However, since a considerable amount of hydrated metal compound is required in order to obtain equivalent flame retardancy as compared with other organic flame-retardant compounds, it significantly reduces polymer physical properties. In order to realize flame retardancy equivalent to that of the aforementioned other organic flame-retardants without degrading polymer physical properties, a hydrated metal compound having a small particle diameter must be uniformly dispersion-stabilized as a particle unit without being aggregated in a resin. For this reason, when particles consisting of a metal hydrate are mixed into a resin, it is preferable to form a uniform covering layer on a particle surface in order to secure dispersibility in a resin, and prevent an active group from influencing on a resin and damaging the resin properties.

As a method of forming a covering layer on a particle surface, first, surface treatment with higher fatty acid, and formation of a silica layer are known (for example, see Japanese Patent Application Laid-Open (JP-A) Nos.52-30262, 2003-253266). However, when the method is applied to nano-size particles, since particles do not sufficiently disperse under conventional reaction conditions, and covering reaction rate is high, particles undergo covering reaction in the aggregated state and, consequently, uniform covered particles cannot be obtained.

In addition, there is a method of treating a surface of an inorganic powder with polyamino acid, or reacting vapor phase cyclic organosiloxane on the surface (for example, see JP-A Nos.57-145006, 61-268763). However, dispersibility is not assured even in these methods when applied to nano-size particles, and aggregated materials are generated.

In addition, there has been proposed a curing resin composition in which aluminum hydroxide is used as a filler in an ultraviolet-ray curing resin and/or a thermosetting resin (for example, see JP-A No.10-36682). However, in this method, particularly, when a flame-retardant having a large particle diameter is blended in a photocuring resin, light permeability deteriorates during curing, and photocuring property diminished.

Further, there has been proposed a photopolymerizable composition in which a photopolymerizable monomer or oligomer is combined with a water-repellent fused polycyclic compound (for example, see JP-A No.2004-131632). However, since the water-repellent fused polycyclic compound used herein is a halogen compound, the method has a problem from the viewpoint of reducing impact on the environment.

Thus, regarding making a resin flame-retardant by photopolymerization which is indispensable in the aforementioned covering material for optical fiber, technology for obtaining high flame retardancy while maintaining mechanical properties of a resin without causing environmental problems has not been established yet.

SUMMARY OF THE INVENTION

The present invention was made in view of the aforementioned problems of the related art.

That is, the invention provides a novel photopolymerizable composition having little reduction in mechanical physical property and little environmental load, and a flame-retardant resin-formed article using the same. Specifically, the invention provides a photopolymerizable composition having good photopolymerization efficiency, and a flame-retardant resin-formed article in which harmful gas is not generated after photopolymerization, and high flame retardancy is obtained, and which does not significantly reduce polymer physical property.

For conventional flame-retardants, fireproofing of a resin has been considered by blending a large amount of at least around 50 to 150 parts by mass of flame-retardant particles having a particle diameter in a range of approximately 1 to 50 μm. Since blending of a large amount of such particles reduces the mechanical property and photocuring property of a resin, blending of other additive or other resin has been tried.

In order to solve the aforementioned problems, the present inventors intensively studied application to a resin of fine flame-retardant particles, which increase a specific surface area of particles and increase a contact area with a polymer. As a result, the present inventors found that, by blending particular flame-retardant particles having a volume average particle diameter in a range of approximately 1 to 500 nm in a photopolymerizable reaction, equivalent or superior flame retardancy and better photopolymerization property are obtained at low filling as compared with the conventional flame-retardant having a volume average particle diameter of around 0.5 to 50 μm, which resulted in completion of the invention.

Namely, the present invention provides a photopolymerizable composition comprising: flame-retardant particles which have an average diameter of about 1 to 500 nm and comprise a hydrated metal; and a photopolymerization reactive material.

DETAILED DESCRIPTION OF THE INVENTION

Hereinafter, the present invention is explained in detail.

Photopolymerizable Composition

The photopolymerizable composition of the present invention at least includes flame-retardant particles which have a volume average diameter of approximately 1 to 500 nm and contain a hydrated metal, a photopolymerization reactive materials.

As described above, flame-retardant particles such as a hydrated metal compound which has conventionally been used as a flame-retardant must be blended in a matrix resin in a large amount in order to obtain equivalent flame retardancy as compared with other organic flame-retardant compounds, thereby significantly reducing polymer physical property. For this reason, in order to prevent reduction in polymer physical property, low filling of a flame-retardant is necessary.

In the invention, the term "flame-retardant" means that, when 5 parts by weight of a flame-retardant compound is blended with an ethylene-vinyl acetate copolymer resin, the peak of heat release rate, as specified by ISO 5660-1, of the resultant mixture is lower than that of the copolymer resin alone by 25% or more.

In addition, when a matrix resin is a photopolymerizable resin, usually, photopolymerization is performed after flame-retardant particles are blended into a photopolymerizable composition before photopolymerization. When a particle diameter of flame-retardant particles in a photopolymerizable composition is large, or dispersibility is not uniform, light permeability during polymerization is not sufficient, polymerization rate is reduced, and a deep part cannot be sufficiently cured. Therefore, low filling of a flame-retardant is effective also in this case.

As one method of the low filling, by making flame-retardant particles even finer into nano size to increase a specific surface area of particles and, consequently, increasing the contact area with a polymer, flame-retardant performance comparable to that of conventional halogen-based flame-retardant can be realized even by addition of a small amount.

That is, the hydrated metal compound used as a flame-retardant has two effects, which are an effect of releasing water by thermal decomposition at burning to reduce the heat amount at burning, and an effect of diluting a burning gas generated from a polymer at burning. Moreover, it is known that, usually, the effect is not sufficiently realized unless a large amount of a flame-retardant is filled. However, this is indeed a phenomenon seen in the conventional hydrated metal compounds having a micro size particle diameter.

The present inventors found out that, by making a particle diameter of a flame-retardant into nano size, the effect of reducing a heat amount, and the effect of diluting a burning gas produced from a polymer at burning can be more closely and more effectively exerted. This is because the particle diameter effect between micro size and nano size is evident, for example, as is obvious when comparing which is more effective for extinguishing a burning material-with water supplied by a watering pot, or with fine water droplets by spraying.

Particularly, in the invention, by mixing flame-retardant particles of a small diameter containing a particular metal hydrate with a photopolymerizable reactant, a photopolymerizable composition excellent in transparency as a composition can be obtained. As result, since polymerization efficiency by light irradiation at photopolymerization is not reduced, it was found that the resulting flame-retardant resin-formed article has better productivity, and a uniform article having no mold unevenness can be obtained.

Hereinafter, the constitution of the photopolymerizable composition of the present invention and the like are explained.

Photopolymerizable Composition

The photopolymerizable composition of the present invention is a raw material for obtaining the flame-retardant resin formed article of the present invention, and at least includes the flame-retardant particles and the photpolymerization reactive material.

Flame-Retardant Fine Particles

A volume average particle diameter of the flame-retardant fine particles is in s range of about 1 to about 500 nm. The volume average particle diameter is preferably in a range of about 1 to about 200 nm, more preferably in a range of about 5 to about 200 nm, and still more preferably in a range of about 10 to about 200 nm (particularly about 10 to about 100 nm).

When the volume average particle diameter of the flame-retardant fine particles of less than 1 nm, it may lead deterioration in flame-retardancy retention capacity, while the volume average particle diameter of over 500 nm may lead flame retardancy similar to those of commercially available flame-retardant particles having a volume average particle diameter of 1 μm and requires a large amount of the particles to be blended in order to obtain sufficient flame retardancy.

Flame-retardant fine particles having a volume average particle diameter in the above range can be uniformly dispersed in a photopolymerizable reaction product to obtain the polymers such as the photo-curable resins described below. Moreover, flame-retardant fine particle having a volume average particle diameter of a nanometer-order size can also form minute complexes and can provide a photopolymerizable composition having a high transparency.

As the metal hydrate, for example, a hydrate of one kind of metal selected from the group consisting of Mg, Ca, Al, Fe, Zn, Ba, Cu and Ni can be used. Since it is easy to make these metal hydrates into fine particles, and these hydrates are stable as well as excellent in endothermic property by heating, and dehydration reactivity, excellent flame retardancy is exerted. Among the aforementioned metal hydrate compounds, hydrates of Mg, Al and Ca are particularly preferable.

The hydrated metals are not particularly limited as long as they can retain a flame-retardant component. Examples thereof include hydrated metal compounds such as aluminum hydroxide, magnesium hydroxide, calcium hydroxide, iron hydroxide, zinc hydroxide, copper hydroxide, nikkel hydroxide and the like; and hydrates such as calcium aluminate, calcium sulfate dihydrate, zinc borate and barium metaborate. Further, complexes of these hydrated metals can also be used. Among them, magnesium hydroxide, aluminum hydroxide and calcium hydroxide are preferable.

In addition, as the metal hydrate, a hydrate of a composite metal containing Mg and one or more kinds selected from the group consisting of Ca, Al, Fe, Zn, Ba, Cu and Ni may also be used. Thus, when a metal Mg is used as an essential component, and various metals are complexed with this, the flame-retardant can be improved. For example, when Mg is complexed with Ni or Fe, action of extracting hydrogen in a hydrocarbon derived from resin components volatilized at burning is generated, and the effect of making a resin component flame-retardant, and the effect of lowering smoking can be enhanced. In addition, when Mg and Al are complexed, the flame-retardant effect can be improved by adjusting a water releasing temperature at burning.

When hydrated metal containing magnesium and at least one selected from the group consisting of Ca, Al, Fe, Zn, Ba, Cu and Ni, the hydrated metal is represented by the following Formula (1).

$$MgM_x.(OH)_y \quad \text{Formula (1)}$$

In Formula (1), M represents one or more of metal(s) that is(/are) selected from the group consisting of Ca, Al, Fe, Zn, Ba, Cu and Ni; x represents a real number in a range of 0.1 to 10; and y represents an integer of 2 to 32.

Preferable examples of M includes Ca, Al, Fe, Zn, Ba, Cu, and Ni. Specifically, preferable examples of $MgM_x$ includes $MgAl_x$, $MgCa_x$, $MgZn_x$, $MgFe_x$, and $Mg(Al/Ca)x$.

In order to improve dispersibility of flame-retardant particles of nano size in a resin after polymerization, it is preferable to form a uniform covering layer on a surface of flame-retardant particles in the invention (hereinafter, the flame-retardant particles are referred to as "surface-covered flame-retardant particles" in some cases). When a covering layer is formed, a flame-retardant component can be stably retained in metal hydrate particles and, at the same time, affinity for a resin after polymerization can be greatly improved. In addition, it is preferable that the covering layer contains an organic compound or a polysilicone.

The organic compound preferably is not particularly limited, and preferably includes an organic group that can bind to the frame-retardant particles. A thin organic layer can be uniformly formed on surfaces of the inorganic fine particles by binding such organic groups group to the frame-retardant particles.

The organic compound preferably has at the terminal of the hydrophobic group a binding group for forming a bond with the inorganic fine particles.

Examples of the binding group include a hydroxyl group, a phosphate group, a phosphonium salt group, an amino group, a sulfate group, a sulfonate group, a carboxyl group, hydrophilic heterocyclic groups, polysaccharide groups (e.g., sorbitol, sorbit, sorbitan, sucrose esters, and sorbitan ester residues), polyether groups (e.g., polyoxyalkylene groups having an alkylene group of 2 to 4 carbon atoms, such as polyoxyethylene and polyoxypropylene groups), hydrolyzable groups (e.g., alkoxy groups having 1 to 4 carbon atoms such as methoxy, ethoxy, propoxy, isopropoxy, and butoxy groups); and halogen atoms (e.g., bromine, and chlorine).

When the binding group is an anionic group (e.g., a sulfate group, a sulfonate group, or a carboxyl group), the binding group may form a salt with any base. Examples of the base include inorganic bases (e.g., alkaline earth metals such as calcium and magnesium and alkali metals such as sodium and potassium; and ammonia); and organic bases (e.g., amines). Further, if the binding group is a cationic group (e.g., an amino group), the binding group may form a salt with any acid, including inorganic acids (e.g., hydrochloric acid, and sulfuric acid) and organic acids (e.g., acetic acid). The cationic group may form a salt with an anionic group (in particular, a carboxyl or sulfate group). Alternatively, the organic compound may have both a cationic group and an anionic group as the binding groups.

As described above, preferred examples of the binding group include ionic groups (anionic and cationic groups) and hydrolyzable groups, and thus the bond between the binding group and the inorganic fine particles may be either an ionic or covalent bond.

Examples of the organic group of the organic compound include groups which acts as a hydrophobic group in surfactants (such as higher fatty acid residues, higher alcohol residues, or alkylaryl groups). Examples of the higher fatty acids include saturated fatty acids having about 8 to about 30 carbon atoms (preferably saturated fatty acids having about 10 to about 28 carbon atoms, and more preferably saturated fatty acids having about 12 to about 26 carbon atoms) such as lauric acid, myristic acid, palmitic acid, arachic acid, behenic acid, rignoceric acid, cerotic acid, caprylic acid, capric acid, daturic acid, stearic acid, montanic acid, and melissic acid; and unsaturated fatty acids having about 12 to about 30 carbon atoms (preferably unsaturated fatty acids having about 14 to about 28 carbon atoms, and more preferably unsaturated fatty acid having about 14 to about 26 carbon atoms) such as elaidic acid, linoleic acid, linolenic acid, linderic acid, oleic acid, gadoleic acid, erucic acid, and brassidic acid.

The hydrophobic group can be a higher fatty acid residue or a higher alcohol residue corresponding to the higher fatty acid (e.g., higher fatty acid residues having about 8 to about 24 carbon atoms (preferably higher fatty acid residues having about 10 to about 22 carbon atoms, and more preferably higher fatty acid residues having about 12 to about 20 carbon atoms) such as octyl, nonyl, dodecyl, tetradecyl, hexadecyl (cetyl), and octadecyl groups).

Examples of the alkylaryl group include alkyl (having about 1 to about 20 carbon atoms)-aryl (having about 6 to about 18 carbon atoms) groups, such as hexylphenyl, octylphenyl, nonylphenyl, decylphenyl, dodecylphenyl, isopropylphenyl, butylphenyl, amylphenyl, and tetradecylphenyl groups. Alkyl (having about 6 to about 18 carbon atoms)-aryl (having about 6 to about 12 carbon atoms) groups are preferable, and alkyl (having about 6 to about 16 carbon atoms)-phenyl groups are more preferable.

The hydrophobic group may further have any other substituent group (e.g., alkyl groups having 1 to 4 carbon atoms).

The scope of the polysilicone is not particularly limited as long as it has a siloxane bond, and preferably includes polymers of cyclic organosiloxane compounds which are represented by the following Formulae (2a) or (2b).

Formula (2)

Formula (2a)

Formula (2b)

In the above formulae, n represents an integer of 3 to 8. When n is smaller than 2, a boiling point of a compound represented by Formula (2a) or (2b) is low and an amount of the compound which is absorbed to the flame-retardant particles increases. When n is larger than 7, a compound represented by Formula (2a) or (2b) is less volatile and causes an insufficient overcoating treatment. Tetramers, pentamers, and hexamers of those represented by Formula (2a) or (2b) are particularly preferable for their three dimensional characteristics.

The compound represented by Formula (2a) and the compound represented by Formula (2b) can be used singly or in combination of two or more thereof in the present invention. A degree of polymerization (a number of repeating of units) is preferably in a range of about 10 to 1000, and more preferably in a range of about 10 to 100. Further, the cover layer may include the polymer and the organic compound in combination.

By using the aforementioned polysilicone having low surface energy as a covering layer, when surface-covered flame-retardant particles are mixed with a photopolymerizable reaction, and the mixture is polymerized, it becomes difficult to cause plasticization of a resin (flame-retardant resin-formed article).

In addition, when formed into a flame-retardant resin-formed article, a polysilicone layer on a surface forms a heat barrier layer at burning and, by forming a covering layer of a polysilicone on a particle surface, since water released from metal hydrate particles makes the heat barrier layer foam, thermal insulating property of the heat barrier layer is enhanced, and the flame-retardant effect can be improved.

An amount of the organic compound which covers a surface of the surface-covered flame-retardant particles of the present invention is preferably in a range of about 1 to 200% by mass, is more preferably in a range of about 20 to 100% by mass, and is particularly preferably in a range of about 30 to 80% by mass, relative to a total mass of the surface-covered flame-retardant particles. When the above-described amount is smaller than about 1% by mass, a dispersed state of ingredients in the photopolymerizable composition may become less uniform because of generation of aggregations therein. When he above-described amount is larger than about 200% by mass, a resin formed by polymerizing the photopolymerizable composition may become plastic.

An amount of the polysilicone which covers a surface of the surface-covered flame-retardant particles of the present invention is preferably in a range of about 20 to 200% by mass, and is more preferably in a range of about 20 to 80% by mass, relative to a total mass of the surface-covered flame-retardant particles. When the above-described amount is smaller than about 20% by mass, a dispersed state of ingredients in the photopolymerizable composition may become less uniform because of generation of aggregations therein. When he above-described amount is larger than about 200% by mass, a resin formed by polymerizing the photopolymerizable composition may become plastic.

A uniformity of the cover layer can be measured by observing the surface-covered flame-retardant particles by using a transmission electron microscope.

A volume average diameter of the surface-covered flame-retardant particles, which may be an average diameter of a circumscribed circle of the particles in a case when the particles have non-spherical shape, is similar to that of the flame-retardant particles described above.

A degree of dispersing of the flame-retardant particles of the present invention is preferably in a range of about 0.1 to 0.3, is more preferably in a range of about 0.1 to 1.0, and particularly preferably in a range of about 0.1 to 0.8. A smaller degree of dispersing designates a narrower size distribution range of the flame-retardant particles, namely, more uniformity in size of the flame-retardant particles. When the degree of dispersing of the flame-retardant particles is within the above-described range, flame retardancy and mechanical property of resins in which the flame-retardant particles are dispersed become uniform.

In the present specification, the volume average particle diameter and dispersity are measured with a laser Doppler heterodyne-type particle size distribution meter (trade name: MICROTRAC-UPA150UPA, manufactured by Nikkiso Co., Ltd.). Specifically, based on a measured particle size distribution, an accumulated distribution is drawn from a small particle diameter side regarding a volume, and a particle diameter at accumulation 50% is adopted as a volume average particle diameter. In addition, a particle size distribution is drawn regarding a mass and, setting a particle diameter at accumulation 90% from a small particle diameter side to be $D_{90}$, and a particle diameter at accumulation 10% to be $D_{10}$, dispersity is defined as $\log(D_{90}/D_{10})$. This measuring method is the same hereinafter.

A manuafctring method for preparing the surface-covered flame-retardant particles is not particularly limited as long as it satisfies the aforementioned structure and properties. Examples include a method of dispersing metal hydrate particles in an aqueous solution in which an organic compound metal salt and a dispersant have been dissolved, and forming an organic compound layer on a surface thereof, a method of reacting a vaporized organic siloxane compound on a surface of metal hydrate particles, to form a polysilicone compound layer, and a method of developing an alkyl acid metal salt into an organic solvent to form a reverse micelle, and converting a metal ion into metal oxide to form surface-covered particles.

An amount of the flame-retardant particles which are contained in the photopolymerizable composition of the present invention is preferably in a range of about 1 to 100 parts by mass, and is more preferably in a range of about 5 to 100 parts by mass, relative to 100 parts by mass of the photopolymerization reactive material, which is described below.

Photopolymerizable Reactant

A photopolymerizable reaction in the invention includes a substance, which is activated by absorbing light at light irradiation, and initiates polymerization, and a substance, which is dissociated by the light, and initiates polymerization with a produced active group. Specifically, these include photopolymerizable monomers or oligomers, and photopolymerizable resins.

The photopolymerizable monomer or oligomer (hereinafter, referred to as "photopolymerizable compound" in some cases) is not particularly limited as long as it is a compound having a site which is polymerizable or crosslinkable (or curable) by light irradiation. Examples of such a site include a reactive nitrogen atom such as a nitrogen atom to which a hydrogen atom is bound. Specifically, it is preferable that a photopolymerizable monomer or oligomer used in the invention has a nitrogen atom-containing tethering group such as a urethane linkage (or urethane group), an amide linkage (or amide group), and a urea linkage (or urea group).

In addition, the photopolymerizable compound usually has a photopolymerizable group (e.g. (meth)acryloyl group, vinyl group, allyl group, vinylene group etc.) in a molecule. A photopolymerizable monomer or oligomer may have the photopolymerizable group via a tethering group (ester linkage, amino linkage, urethane linkage, urea linkage, epoxy linkage etc.). The photopolymerizable group may be situated at a main chain of a photopolymerizable monomer or oligomer, and is usually situated at a terminal and/or side chain in many cases.

Examples of a specific aspect of a photopolymerizable compound include monomers, and oligomers (or prepolymers) having the nitrogen atom-containing tethering group, and having a photopolymerizable group such as a (meth)acryloyl group.

As such a photopolymerizable monomer or oligomer, for example, a reaction product of a base compound (monomer, oligomer (including polymer) etc.) having a reactive group (a) (hydroxyl group, carboxyl group, amino group, isocyanate group, etc.), and a polymerizable compound (c) having a group (b) (hydroxyl group, carboxyl group, amino group, isocyanate group, epoxy group, etc.) which can be reacted with this base compound can be used.

For example, relative to the following (a1) to (a4) as a reactive group (a) of a base compound, as a reactive group (b1) to (b4) of a polymerizable compound to be combined, the following compositions can be exemplified. An expression in a parenthesis indicates a binding format between each reactive group (a) and reactive group (b).

(a1) Hydroxyl group:
(b1) Carboxyl group (ester bond), isocyanate group (urethane bond)
(a2) Carboxyl group:
(b2) Hydroxyl group (ester bond), amino group (amide bond), epoxy group (ester bond), isocyanate group (urethane bond)
(a3) Amino group:
(b3) Carboxyl group (amide bond), epoxy group (ester bond), isocyanate group (urethane bond)
(a4) Isocyanate group:
(b4) Hydroxyl group (urethane bond), carboxyl group (amide bond), amino group (urea bond)

Examples of the polymerizable compound (c) include a polymerizable compound having a hydroxyl group (e.g. $C_{3-6}$ (meaning "a carbon number is 3 to 6"; the same hereinafter) alkenol such as allyl alcohol; hydroxy $C_{2-6}$alkyl (meth)acrylate such as 2-hydroxyethyl (meth)acrylate, 2-hydroxypropyl (meth)acrylate, butanediol mono(meth)acrylate; polyoxy $C_{2-6}$alkylene glycol mono(meth)acrylate such as diethylene glycol mono(meth)acrylate; N-hydroxy $C_{1-4}$alkyl (meth)acrylamide such as N-methylol (meth)acrylamide), a polymerizable compound having a carboxyl group (or halogenated acyl group) (e.g. $C_{3-6}$alkenecarboxylic acid such as (meth)acrylic acid, $C_{3-6}$alkenecarboxylic acid halide such as (meth)acryl chloride), a polymerizable compound having an amino group (e.g. allylamine etc.), a polymerizable compound having an epoxy group (e.g. allyl glycidyl ether, glycidyl (meth)acrylate etc.), and a polymerizable compound having an isocyanate group (e.g. vinyl isocyanate etc.). Among these compounds, in particular, (meth)acrylic acid ester having a hydroxyl group such as hydroxy $C_{2-6}$alkyl (meth)acrylate is preferable.

For reacting the base compound and the polymerizable compound (c), any conventional method can be used depending on kinds of a reactive group (a) and a reactive group (b).

For example, when the reactive group (a) is an isocyanate group, and the reactive group (b) is a hydroxyl group, a urethanization reaction may be performed by a conventional method, for example, in the presence of a catalyst, in the inert gas atmosphere, or under warming.

Specific photopolymerizable monomers and oligomers will be exemplified below.

Photopolymerizable Monomer and Oligomer having a Urethane Linkage

Examples of the photopolymerizable monomer and oligomer having a urethane linkage include a reaction product of a base compound having at least an isocyanate group such as urethane (meth)acrylate, and a polymerizable compound (c) having a group, which is reactive with an isocyanate group, such as a hydroxyl group.

Examples of the base compound having an isocyanate group include a polyisocyanate component, and a urethane prepolymer having an isocyanate group at a terminal (condensation product of polyisocyanate component and polyol component). Examples of a preferable base compound include a base compound having a urethane linkage (urethane prepolymer etc.).

Examples of the polyisocyanate component include diisocyanate such as aliphatic diisocyanate ($C_{2-10}$alkylene diisocyanate optionally having a substituent such as hexamethylene diisocyanate, trimethylhexamethylene diisocyanate, and lysine diisocyanate), alicyclic diisocyanate ($C_{5-8}$cycloalkane-diisocyanate such as cyclohexane diisocyanate; isocyanato$C_{5-8}$cycloalkyl-$C_{1-4}$alkyl-isocyanate such as isophorone diisocyanate; di(isocyanato$C_{1-4}$alkyl)$C_{5-6}$cycloalkane such as hydrogenated xylylene diisocyanate; bis(isocyanato$C_{5-8}$cycloalkyl)$C_{1-4}$alkane such as hydrogenated diphenylmethane-4,4'-diisocyanate), aromatic diisocyanate ($C_{6-12}$arylene-diisocyanate such as tolylene diisocyanate, naphthalene diisocyanate, and tolidine diisocyanate; aromatic diisocyanate such as di(isocyanato$C_{6-10}$aryl)$C_{1-4}$alkane such as diphenylmethane diisocyanate; aromatic aliphatic diisocyanate such as bis(isocyanato$C_{1-4}$alkyl)$C_{6-10}$arylene such as xylylene diisocyanate; aromatic diisocyanate having a hetero atom (oxygen atom, sulfur atom etc.) such as di(isocyanatophenyl)ether, di(isocyanatophenyl)sulfone, and 2,5-bis(4-isocyanatophenyl)-3,4-diphenylthiphene). These polyisocyanates can be used alone, or by combining two or more kinds.

Examples of the polyol include diols such as low molecular weight diol [alkylene glycol ($C_{2-12}$ alkylene glycol such as ethylene glycol, propylene glycol, butanediol, hexanediol etc.), aromatic diol (arylenediol such as resorcine, xylene glycol, fluorenedimethanol, bisphenol A etc.), alicyclic diol (cyclohexenediol, cyclohexenedimetanol, hydrogenated bisphenol A etc.), polyether diol (e.g. poly(oxy$C_{2-4}$alkylene) glycol such as diethylene glycol, triethylene glycol, dipropylene glycol, and polyoxytetramethylene glycol, bisphenol A-alkylene oxide adduct) etc.], polyester diol [e.g. ring opening polymer of lactone ($C_{4-12}$lactone such as ε-caprolactone), ring opening copolymer of the low molecular weight diol and lactone ($C_{4-12}$lactone such as ε-caprolactone), reaction product of the low molecular weight diol and dicardoxylic acid (the above-exemplified dicarboxylic acid such as adipic acid)], polyester etherdiol (polyesterdiol using the aforementioned polyester diol as a part of diol component), polycarbonate diol, and polyurethane diol. These polyols can be used alone or in combination of two or more thereof.

In the urethane prepolymar, kinds of combinations of polyisocyanate components and polyol components are not particularly limited, and examples thereof include a condensation product of the aromatic diisocyanate and the low molecular weight diol, and a condensation product of the aliphatic diisocyanate and the polyester diol or polyether diol.

Examples of the polymerizable compound (c) having a group which is reactive with an isocyanate group include a polymerizable compound having a hydroxyl group, and a polymerizable compound having a carboxyl group. Among these compounds, a (meth)acryloyl group-containing compound such as hydroxyl $C_{2-6}$ alkyl (meth)acrylate is particularly preferred.

Examples of a preferable photopolymerizable resin having a urethane linkage include urethane (meth)acrylate (urethane acrylate or urethane methacrylate) obtained by a reaction of a compound having at least an isocyanate group (the polyisocyanate component or the urethane prepolymer) and the (meth)acrylate having a hydroxyl group (e.g. the hydroxy$C_{2-6}$alkyl (meth)acrylate).

In the invention, a photopolymerizable reaction preferably contains urethane acrylate and/or urethane methacrylate in that they have photopolymerizability and are excellent in flexibility.

A photopolymerizable resin having a urethane linkage can be usually prepared by a reaction of a base compound and a polymerizable compound (c), and a timing of introducing a photopolymerizable group such as a (meth)acryloyl group is not particularly limited. Examples of the reaction for forming urethane (meth)acrylate include a method of reacting polyisocyanate and a polymerizable compound having a hydroxyl group, and a method of reacting polyisocyanate, a polymerizable compound having a hydroxyl group, and polyol. In the latter method, polyisocyanate, a polymerizable compound having a hydroxyl group, and polyol may be charged into a reaction system to react them, or one component of a polymerizable compound having a hydroxyl group and polyol, and an excessive amount of polyisocyanate may be reacted to produce a compound having an isocyanate group at a terminal, and this compound may be reacted with other component.

In preparation of the urethane, a ratio of a total hydroxyl component having polyol and hydroxyl group relative to 1 mole of an isocyanate group of a polyisocyanate component is, typically, preferably in a range of around 0.7 to 1.5 equivalent, more preferably in a range of around 0.8 to 1.2 equivalent, further preferably in a range of around 0.9 to 1.1 equivalent. In addition, in a total hydroxyl component, a ratio of a polyol component and a (meth)acrylate component having a hydroxyl group is such that former/latter (molar ratio) is preferably in a range of around 0/100 to 70/30, more preferably in a range of around 0/100 to 50/50, further preferably in a range of around 0/100 to 30/70.

Photopolymerizable Monomer and Oligomer having Epoxy Linkage

Examples of a photopolymerizable monomer or oligomer having an epoxy linkage include: polyglycidyl ether and polyglycidyl ester which are obtained by reacting a polyvalent phenol such as bisphenol A, halogenated bisphenol A, catechol, or resorcinol, or a polyvalent alcohol such as glycerin, with epichlorohydrin or methylepichlorohydrin in the presence of a basic catalyst; epoxy novolak obtained by condensing a novolak-type phenol resin with epichlorohydrin or methylepichlorohydrin; and epoxylated polyolefin, epoxylated polybutadiene, dicyclopentadienylated oxide, and epoxylated vegetable oil which have been epoxylated by an peroxidation method.

These can be used alone or in combination of two or more thereof.

Photopolymerizable Monomer or Oligomer having Amide Linkage

Examples of a photopolymerizable monomer or oligomer having an amide linkage include a reaction product of a base compound having at least one reactive group selected from the group consisting of an amino group and a carboxyl group, and a polymerizable compound (c) having a group which is reactive with an amino group or a carboxyl group (examples thereof include carboxyl group, epoxy group, and isocyanate group).

Examples of the base compound include a diamine component and an amide linkage-containing oligomer (such as a condensation product of diamine component and either polyvalent carboxylic acid or its anhydride component).

Examples of the diamine include an aliphatic diamine, an alicyclic diamine and an aromatic diamine. Examples of the aliphatic diamine includes $C_{2-14}$alkylenediamine such as diaminobutane, hexamethylenediamine, 2,5-dimethylhexamethylenediamine, and trimethylhexamethylenediamine. Examples of the alicyclic diamine include diamino$C_{4-10}$cycloalkane such as diaminocyclohexane, bis(amino$C_{5-8}$cycloalkyl)$C_{1-4}$alkane such as bis(4-aminocyclohexyl)methane, amino$C_{5-8}$cycloalkyl-$C_{1-4}$alkylamine such as menthenediamine, and isophoronediamine. Examples of the aromatic diamine include $C_{6-14}$arylenediamine such as phenylenediamine, di(amino$C_{6-14}$aryl)$C_{1-4}$alkane such as diaminodiphenylmethane, di(amino$C_{1-4}$alkyl)$C_{6-10}$allene such as xylilenediamine, and di(amino$C_{6-14}$aryl)ether such as diaminodiphenyl ether.

These diamines may be used alone or in combination of two or more thereof.

Examples of the polyvalent carboxylic acid or its anhydride include: a dicarboxylic acid such as an aliphatic dicarboxylic acid, alicyclic dicarboxylic acid, and aromatic dicarboxylic acid; a tricarboxylic acid; a tetracarboxylic acid; and anhydrides thereof. Examples of the aliphatic dicarboxylic acid include $C_{4-20}$alkanedicarboxylic acid such as adipic acid, sebacic acid, dodecanedioic acid. Examples of the alicyclic dicarboxylic acid include $C_{5-8}$cycloalkanedicarboxylic acid such as cyclohexane-1,4-dicarboxylic acid. Examples of the and aromatic dicarboxylic acid include $C_{6-10}$allenedicarboxylic acid such as phthalic acid, phthalic acid anhydride, isophthalic acid, terephthalic acid, naphthalenedicarboxylic acid, or its anhydride. Examples of the tricarboxylic acid include $C_{6-10}$allenetricarboxylic acid such as trimellitic acid, trimellitic acid anhydride. Examples of the tetracarboxylic acid include $C_{6-14}$allene-tetracarboxylic acid such as pyromellitic acid and pyromellitic acid anhydride, $C_{10-20}$ hydrocarbon such as biphenyltetracarboxylic acid, and bis(dicarboxy$C_{6-10}$aryl)$C_{1-4}$alkanone such as benzophenonetetracarboxylic acid. Specifically, examples of $C_{10-20}$ ring-aggregated hydrocarbon include biphenyltetracarboxylic acid anhydride.

These polyvalent carboxylic acids or their anhydrides may be used alone or in combination of two or more thereof.

Examples of an oligomer containing an amide linkage include a reaction product of the diamine and the polyvalent carboxylic acid or its anhydride, and an oligomer obtained by a polycondensation reaction of aminocarboxylic acid (examples of the aminocarboxylic acid include an amino$C_{4-20}$alkanecarboxylic acid such as aminoundecanoic acid, amino aromatic carboxylic acid such as aminobenzoic acid, or a reactive salt compounds thereof (acid halide such as acid chloride)) or an oligomer obtained by a ring opening reaction of lactam (examples of the lactam include a $C_{4-20}$lactam such as caprolactam, and laurolactam). In a polycondensation reaction of aminocarboxylic acid, a basic substance (such as pyridine) may be added thereto in order to trap generated hydrogen chloride.

Examples of the oligomer containing an amide linkage include an oligomer of polyamidic acid (precursor of polyimide resin) obtained by a reaction of the tetracarboxylic acid (such as benzophenonetetracarboxylic acid) or its anhydride with the diamine (such as one selected from aliphatic diamines, alicyclic diamines and aromatic diamines, and examples thereof include diaminodiphenylmethane).

A reactive group at a terminal in the amide linkage-containing oligomer can be controlled by adjusting a ratio of an amino group and a carboxyl group. In the amide group-containing oligomer used in the invention, a ratio of a carboxyl group relative to 1 mole of an amino group is preferably in a range of around 0.3 to 2 mole, more preferably in a range of around 0.5 to 2 mole, further preferably in a range of around 0.8 to 2 mole.

Examples of the polymerizable compound (c) having a reactive group include a polymerizable compound having a carboxyl group, and a polymerizable compound having an epoxy group. Among these compounds, (meth)acryloyl group-containing compounds such as (meth)acrylic acid, and glycidyl (meth)acrylate are particularly preferable. In addition, a ratio of the polymerizable compound (c) relative to 1 mole of a terminal amino group or carboxyl group is preferably in a range of around 0.7 to 1.3 mole, more preferably in a range of around 0.8 to 1.2 mole, further preferably in a range of around 0.9 to 1.1 mole.

Photopolymerizable Monomer or Oligomer having Urea Linkage

Examples of a photopolymerizable monomer or oligomer having a urea linkage include a reaction product of a base compound having a urea linkage with a polymerizable compound (c) which is reactive with a reactive group (amino group, isocyanate group) of the base compound.

As the base compound having a urea linkage, oligomers using the aforementioned polyamine (particularly, diamine) in place of at least a part of a polyol component explained in the descriptions of photopolymerizable monomer or oligomer having a urethane linkage (particularly, urethane (meth)acrylate) can be used.

The polymerizable compound (c) reactive with a base compound having a urea linkage can be selected in accordance with a kind of a reactive group (a), and examples of the polymerizable compound (c) reactive with an isocyanate group (a) include a polymerizable compound having a hydroxyl group, and a polymerizable compound having a carboxyl group. Examples of the polymerizable compound (c) reactive with an amino group (a) include a polymerizable compound having a carboxyl group or a halogenated acyl group, and a polymerizable compound having an epoxy group. Among these compounds, (meth)acryloyl group-containing compounds such as hydroxy$C_{2-6}$alkyl (meth)acrylate and (meth)acrylic acid are particularly preferable.

The photopolymerizable oligomer may be a homopolymer or a copolymer. For example, the photopolymerizable oligomer may be a copolymer in which at least one component among a nitrogen-containing monomer and a comonomer uses a plurality of monomers. Examples thereof include a copolymer formed by using diamine as a chain extending agent in addition to a reaction of diol and diisocyanate in a urethane oligomer.

Other Components

The photopolymerizable composition of the invention may further contain a photopolymerization initiator. The photopolymerization initiator can be selected in accordance with a light emitting spectrum of an irradiating light source (such as high pressure mercury lamp, and metal halide lamp). Examples of the photopolymerization initiator include benzoin compounds (benzoin, benzoin alkyl ether), benzophenone compounds (benzphenone, 4,4-dimethoxybenzophenone), alkyl phenyl ketone compounds (acetophenone, diethoxyacetophenone, benzyldimethylketal), anthraquinone compounds (anthraquinone, 2-methylanthraquinone), and thioxanthone compounds (2-chlorothioxanthone, alkylthioxanthone).

The above photopolymerization initiators may be used alone or in combination of two or more thereof.

A ratio of a photopolymerization initiator is preferably in a range of around 0.5 to 40 parts by mass, more preferably in a range of around 1 to 30 parts by mass, further preferably in a range of around 2 to 20 parts by mass relative to 100 parts by mass of a photopolymerizable component (the photopolymerizable monomer or oligomer).

In addition, in accordance with necessity, the photopolymerizable composition of the invention may contain a photopolymerizable diluent, and/or a conventional additive such as a coloring agent, a stabilizing agent (such as a heat stabilizing agent, antioxidant, or ultraviolet absorbing agent), a filler, an antistatic agent, a flame-retardant assistant, a leveling agent, a silane coupling agent, or a heat polymerization initiator. Photopolymerizable diluents and additives may be used alone or in combination of two or more thereof.

Examples of the photopolymerizable diluent include a monofunctional monomer (including nitrogen-containing monomers such as the above exemplified reactive polymerizable compounds (c) or vinylpyrrolidone), and a polyfunctional monomer (including bifunctional (meth) acrylates such as: $C_{2-10}$alkylene glycol di(meth)acrylates such as ethylene glycol di(meth)acrylate, propylene glycol di(meth) acrylate, or neopentyl glycol di(meth)acrylate; poly$C_{2-4}$alkylene glycol di(meth)acrylates such as diethylene glycol di(meth)acrylate, triethylene glycol di(meth)acrylate, or polyethylene glycol di(meth)acrylate; glycerin di(meth) acrylate; trimethylolpropane di(meth)acrylate; or pentaerythritol di(meth)acrylate), and trifunctional or polyfunctional (meth)acrylates (including glycerin tri(meth)acrylate, trimethylolpropane tri(meth)acrylate, pentaerythritol tri (meth)acrylate, and pentaerythritol tetra(meth)acrylate).

Photopolymerizable diluents may be used alone or in combination of two or more thereof.

Examples of the flame-retardant assistant include inorganic flame-retardants such as silicon-containing flame-retardant; alcohol-based flame-retardant; metal oxide (such as molybdenum oxide, tungsten oxide, titanium oxide, zirconium oxide, tin oxide, copper oxide, zinc oxide, aluminum oxide, nickel oxide, iron oxide, manganese oxide), or metal sulfide (such as molybdenum sulfide).

The flame-retardant assistants may be used alone or in combination of two or more thereof.

The photopolymerizable composition of the invention can be suitably used as a photopolymerizable coating agent (or photopolymerizable covering composition) for coating a base material. Therefore, in order to improve coating property for a base material, the photopolymerizable composition of the invention may be used in a form of a solution or a dispersion liquid containing a conventional solvent such as alcohols (such as isopropanol etc.), ethers (such as tetrahydrofuran etc.), ketones (such as acetone, methyl ethyl ketone etc.), esters (such as ethyl acetate etc.), aliphatic hydrocarbons (such as hexane etc.), aromatic hydrocarbons (such as toluene etc.), or amides (such as dimethylformamide etc.).

In the photopolymerizable composition of the invention, a concentration of a total amount of the flame-retardant particles and photopolymerizable reaction in a solution or a dispersion liquid is preferably in a range of around 1 to 50% by mass, more preferably in a range of around 5 to 30% by mass, further preferably in a range of around 5 to 20% by mass relative to a total mass of the solution or a dispersion liquid.

The photopolymerizable composition of the invention can be obtained by mixing the aforementioned flame-retardant particles, photopolymerizable reaction and, in accordance with necessity, a photopolymerization initiator, and/or a flame-retardant assistant, and mixing these components by using a mixer.

The mixer is not particularly limited. A method of dispersing with a sealed explosion-preventing-type Henschel mixer is preferably used from the viewpoint of obtaining high dispersibility. In this case, as described above, various solvents may be added as a diluent simultaneously or after mixing.

In the photopolymerizable composition after mixing, it is preferable that the flame-retardant fine particles are uniformly dispersed in the form of particles having a primary particle diameter. The dispersion state may be easily measured by measuring a transmittance of a thin sheet of the flame-retardant resin composition with respect to ultraviolet and/or visible light.

In a typical measurement method, 10 g of flame-retardant fine particles are dissolved in 100 mL of toluene; the sample solution thus obtained is placed on a glass substrate and irradiated with 1.0 J/cm$^2$ of UV ray for 1 minute to form a film having a thickness of 100 μm; and the transmittance of the film is measured by an ultraviolet-visible light spectrophotometer.

The transmittance obtained by the above measurement method is preferably in a range of about 40 to about 90%, more preferably in a range of about 60 to about 90% at a measurement using a wavelength of 550 nm.

The photopolymerizable composition of the invention can be used as various photopolymerizable (or photocuring) resin compositions. In particular, since the aforementioned various functions (including high flame retardancy and high speed polymerizability) are imparted to a photopolymerizable resin (e.g. urethane (meth)acrylate), the composition can be suitably used as a photopolymerization coating agent for coating various base materials (e.g. base materials in utilities in which deterioration or denaturation due to hydrolysis may be easily caused, utilities in which higher flame retardancy is required, or a base material for a utility in which high speed polymerizability is required) by a coating means such as simple coating.

Flame-Retardant Resin-Formed Article

The flame-retardant resin-formed article of the invention is obtained by casting a composition containing the aforementioned photopolymerizable composition of the invention into a mold or coating the composition on a surface of a base material, and, thereafter, irradiating this with the light to photopolymerize (photocure) so as to mold it.

Examples of a light source for performing the light irradiation include a high pressure mercury lamp. Light irradiation condition varies in accordance with a kind of the photopolymerizable reaction and a shape of a photopolymerizable composition. For example, a photopolymerizable composition fixed at a thickness of 0.01 to 1 mm is preferably polymerized and cured by irradiating the light having a light intensity of 0.1 to 10 J/cm$^2$ for 0.1 to 1 seconds.

A shape of the molded flame-retardant resin-formed article of the invention is not particularly limited, and may be a sheet, a bar, a thread or the like. In addition, a size thereof is not limited.

When the photopolymerizable composition of the invention is used as a photopolymerization coating agent, the photopolymerizable composition can be made to be a covering layer having various thicknesses relative to a base material. The composition can be formed into a covering film having a thickness preferably in a range of around 0.01 to 100 μm, more preferably in a range of around 0.1 to 10 μm, further preferably in a range of around 0.1 to 1 μm.

As utility of the flame-retardant resin-formed article of the invention, a covering material for an optical fiber (specifically, covering material constituting a primary layer or a secondary layer) is particularly useful. Examples of a structure of an optical fiber, which can be applied as the covering material for an optical fiber, include a core wire structure, a tape core wire structure, and a multicore wire structure.

Figure 1:
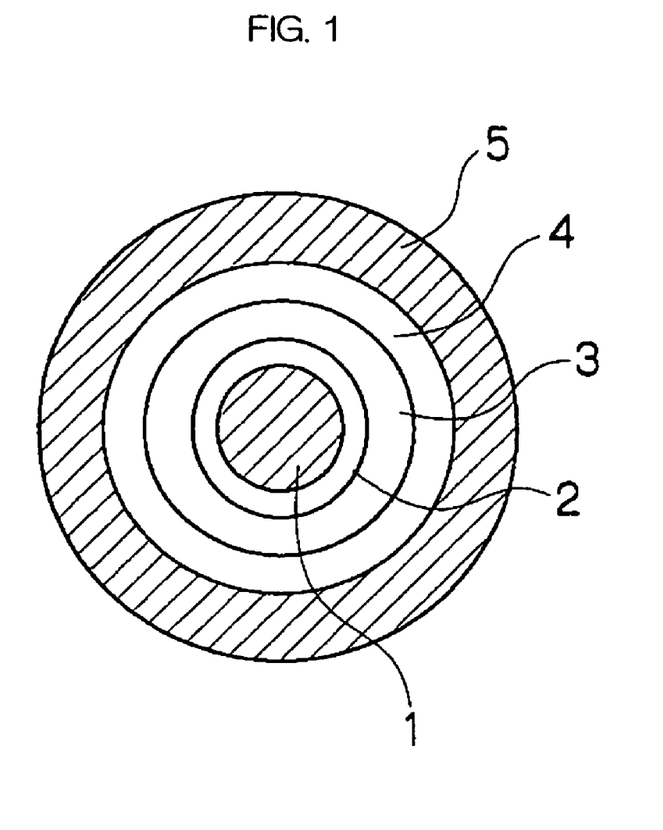
FIG. 1 is a schematic cross-sectional view of a core wire structure.
Figure 2:
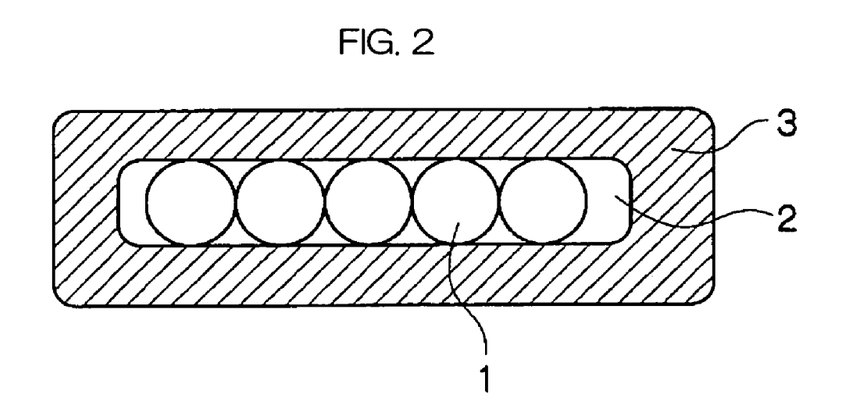
FIG. 2 is a schematic cross-sectional view of a tape core wire structure.

FIG. 1 shows a core wire structure, and FIG. 2 shows a schematic cross-sectional view of one example of a tape core wire structure.

In FIG. 1, a core wire structure is constructed with a glass core wire 1, a primary layer 2 and a secondary layer 3 for covering this core wire 1, a water-shielding tape 4 for water-shielding this primary layer 2 and secondary layer 3, and a cable skin 5 for covering this water-shielding tape 4. In FIG. 2, a tape core wire structure is constructed with a plurality of glass core wires 1, which are arranged in parallel, a primary layer 2 for covering these glass core wires in a tape-like manner, and a secondary layer 3 for covering a tape-like primary layer 2.

A manufacturing method for preparing an optical fiber is not particularly limited. For example, the optical fiber can be prepared by a conventional method such as by coating the photopolymerizable composition of the invention (particularly, it is preferable to use a photopolymerizable composition containing the urethane (meth)acrylate) as a covering layer for at least one of a primary layer 2 and secondary layer 3, in a spun fiber core wire, and photopolymerizing this by irradiation with a light source.

An optical fiber using the flame-retardant resin-formed article of the invention as a covering material not only can provide the aforementioned various functions (high flame retardancy, etc.), but also has various advantages in preparing an optical fiber. Examples of such advantages include the following. By inclusion of the flame-retardant particles (particularly, having the aforementioned covering layer) in the invention, for example, (i) since a molecular structure becomes rigid, linear expansion rate is reduced, expansion and contraction of a fiber covering material (primary layer 2 and/or secondary layer 3) due to temperature change become small, and defective rate in work for precision processing of a connector is reduced, (ii) sliding property between fibers is improved due to improvement in dispersity of flame-retardant particles, and winding at a stage for preparing a continuous optical fiber becomes easy, and (iii) photopolymerization rate is improved, a step of photocuring at a stage of preparing a continuous optical fiber can be shortened, and prepartion rate is improved.

In addition, the flame-retardant resin-formed article of the invention can be used in utility such as various coating materials (woodworking coating material etc.), a sealing material (a sealing material for liquid crystal, etc.), a pattern forming material (photoinsulating material etc.), a semiconductor material, an automobile photocuring-type repairing material, an insulating film, a printed wiring multilayered board, a flexible multilayered board, and a low dielectric reflection preventing film in addition to the aforementioned optical fiber covering material and, particularly, is useful in utility requiring high speed photopolymerizability, high flame retardancy, and high water repellency.

In the flame-retardant resin-formed article of the invention, sufficient flame retardancy can be obtained by photopolymerizing the aforementioned photopolymerizable composition of the invention. Specifically, flame retardancy of the article measured in accordance with the UL-94 test preferably scores HB or higher, more preferably V-2 or higher.

in a range of about 70% to 90%, more preferably in a range of about 75% to 80%. When the gel fraction is less than 70%, bleeding or tackiness is caused, and the article cannot be used as a product in some cases. When the gel fraction exceeds 90%, the cured material of the article fails to have flexibility and it becomes difficult to use the material as the article.

The gel fraction can be measured by placing a flame-retardant resin-formed article as a sample of around 10 mm×10 mm×0.1 mm square in a toluene, refluxing it at 80° C. for 24 hours, drying the remaining sample, and dividing a mass of a dried article by a mass of a sample before placement into toluene.

EXAMPLES

Examples of the present invention will be described below, however, the examples are not intended to restrict the invention.

Examples of the preparation of flame-retardant particles of the present invention having the surface layer will be shown. Further, preparation of flame-retardant resin-formed articles using the flame-retardant particles and evaluation of characteristics thereof will be provided.

Preparation of Flame-Retardant Particles

Flame-retardant particles having a surface layer used in the following Example will be explained.

200 g of magnesium hydroxide particles (trade name: MAGNESIA 50H, manufactured by Ube Material) having a volume average particle diameter of 80 nm as flame-retardant particles, and 200 g of octamethylcyclotetrasiloxane as a cyclic organosiloxane compound are weighed in a separate glass container, respectively. These with a container are disposed in a desiccator, which can be evacuated and sealed. Then, an internal pressure of a desiccator is reduced to 80 mmHg with a vacuum pump, and the desiccator is sealed. Thereafter, the desiccator and the container are treated by allowing to stand for 12 hours under 60° C. environment. After treatment, surface-covered flame-retardant particles (flame-retardant particles) having a treated surface are taken out from a glass container.

A volume average particle diameter of the resulting surface-covered flame-retardant particles is 80 nm, and dispersity of the particles is 0.5. In addition, when surface-covered flame-retardant particles are precisely weighed, and a surface covering weight is calculated, the amount is found to be 50% by mass, and uniform covering is also confirmed by an observation with a transmission electron microscope (trade name: TECNAI G", manufactured by FEI Company).

Example 1

Preparation of Photopolymerizable Composition and Flame-Retardant Resin-Formed Article A composition obtained by mixing 100 parts of urethane acrylate (trade name: CN-983, manufactured by Toagosei Co., Ltd.), 5 parts of magnesium hydroxide having a volume average particle diameter of 80 nm (trade name: 500H, manufactured by Ube Material) and 200 parts of tetarhydrofuran is stirred for 5 hours in a three-neck flask at 60° C. in the nitrogen atmosphere using a magnetic stirrer as a stirrer. Thereafter, to this composition is added 5 parts of a photopolymerization initiator (trade name: IRGACURE® 1850, manufactured by Ciba Geigy), and the materials are further mixed and stirred at a normal temperature. The resulting composition is dried at 60° C. for 12 hours in a vacuum drier to obtain a photopolymerizable composition. An yield therefrom is 99.8%.

This photopolymerizable composition is prepared into a test piece of 10 cm square having a thickness of 100 μm with a spin coater (trade name: ASS-301, manufactured by Active), and this is photopolymerized by irradiating ultraviolet-ray having a light intensity of about 1.0 J/cm$^2$ for 30 seconds to obtain a cured resin seat (flame-retardant resin-formed article). This cured resin is brown and transparent, and has flexibility, and a gel fraction is 77%.

Evaluation of Flame-Retardant Resin-Formed Article

The following flame retardancy test (UL-94) is performed on the sheet-like molded article prepared as described above As the flame retardancy test (UL-94), a 50W vertical flame test is performed according to the known method. A test is performed at a sample thickness of 2 mm. Regarding a flame retardancy test acceptable product, a level of the highest flame-retardant effect is regarded as V0, and a next order is set as V1, V2 and Hb. On the other hand, articles not reaching them are regarded as unacceptable.

Results are shown in Table 1.

Example 2

A photopolymerizable composition and a flame-retardant resin-formed article of Example 2 are prepared in the same manner as described in Example 1, except that the compounded amount of the magnesium hydroxide (trade name: 500H, described above) is changed to 80 parts.

The flame retardancy test is then performed for the flame-retardant resin-formed article of Example 2 in the same manner as described in Example 1. Results are shown in Table 1.

Example 3

A photopolymerizable composition and a flame-retardant resin-formed article of Example 3 are prepared in the same manner as described in Example 1, except that the compounded amount of the magnesium hydroxide (trade name: 500H, described above) is changed to 100 parts.

The flame retardancy test is then performed for the flame-retardant resin-formed article of Example 3 in the same manner as described in Example 1. Results are shown in Table 1.

Example 4

A photopolymerizable composition and a flame-retardant resin-formed article of Example 4 are prepared in the same manner as described in Example 1, except that 5 parts of the surface-covered flame-retardant particles is used in place of the magnesium hydroxide (trade name: 500H, described above).

The flame retardancy test is then performed for the flame-retardant resin-formed article of Example 4 in the same manner as described in Example 1. Results are shown in Table 1.

Example 5

A photopolymerizable composition and a flame-retardant resin-formed article of Example 5 are prepared in the same manner as described in Example 1, except that 5 parts of magnesium hydroxide having a volume average particle diameter of 200 nm (trade name: MGZ-3, manufactured by Sakai Chemical Industry Co., Ltd.) is used in place of the magnesium hydroxide (trade name: 500H, described above).

The flame retardancy test is then performed for the flame-retardant resin-formed article of Example 5 in the same manner as described in Example 1. Results are shown in Table 1.

Example 6

A photopolymerizable composition and a flame-retardant resin-formed article of Example 6 are prepared in the same manner as described in Example 1, except that 5 parts of magnesium hydroxide having a volume average particle diameter of 10 nm (trade name: 100H, manufactured by Ube Material) is used in place of the magnesium hydroxide (trade name: 500H, described above).

The flame retardancy test is then performed for the flame-retardant resin-formed article of Example 6 in the same manner as described in Example 1. Results are shown in Table 1.

Comparative Example 1

A composition obtained by mixing and stirring 100 parts of urethane acrylate (trade name: CN-983, described above) and 5 parts of a photopolymerization initiator (trade name: IRGACURE® 1850, described above) under a normal temperature is used so as to prepare a test piece of 10 cm square having a thickness of 100 μm with a spin coater (trade name: ASS-301, described above), and the test piece is photopolymerized by irradiating ultraviolet-ray having a light intensity of about 1.0 J/cm$^2$ for 30 seconds to obtain a cured resin sample. The flame retardancy test is then performed for the cured resin sample of Comparative example 1 in the same manner as described in Example 1.

Results are shown in Table 1.

Comparative Example 2

A composition obtained by mixing and stirring 100 parts of urethane acrylate (trade name: CN-983, described above), 5 parts of magnesium hydroxide having a volume average particle diameter of 800 nm (trade name: KISUMA 5A, manufactured by Kyowa Chemical Industry Co., Ltd.), and 5 parts of a photopolymerization initiator (trade name: IRGACURE® 1850, described above) under a normal temperature is used so as to prepare a test piece of 10 cm square having a thickness of 100 μm with a spin coater (trade name: ASS-301, described above), and the test piece is photopolymerized by irradiating ultraviolet-ray having a light intensity of about 1.0 J/cm$^2$ for 30 seconds to obtain a cured resin sample. The flame retardancy test is then performed for the cured resin sample of Comparative example 2 in the same manner as described in Example 1.

Results are shown in Table 1.

Comparative Example 3

A cured resin sample of Comparative example 3 is prepared in the same manner as described in Comparative example 2, except that the compounded amount of the magnesium hydroxide (trade name: KISUMA 5A, described above) is changed to 30 parts. The flame retardancy test is then performed for the flame-retardant resin-formed article of Comparative example 3 in the same manner as described in Example 1.

Results are shown in Table 1.

TABLE 1

| | Example 1 | Example 2 | Example 3 | Example 4 | Example 5 | Example 6 | CE* 1 | CE* 2 | CE* 3 |
|---|---|---|---|---|---|---|---|---|---|
| Flame-retardant particle diameter (nm) | 80 | 80 | 80 | 80 | 200 | 10 | — | 800 | 800 |

TABLE 1-continued

|  | Example 1 | Example 2 | Example 3 | Example 4 | Example 5 | Example 6 | CE* 1 | CE* 2 | CE* 3 |
|---|---|---|---|---|---|---|---|---|---|
| Flame-retardant particle blending amount (part) | 5 | 80 | 100 | 5 | 5 | 5 | 0 | 5 | 30 |
| Flame retardancy (UL-94) | HB | V2 | V2 | V2 | V2 | V2 | Unacceptable | Unacceptable | Unacceptable |
| Gel fraction (%) | 77 | 75 | 75 | 78 | 72 | 85 | 78 | 5 | 5 |

*CE: Comparative example

As shown in Table 1, a gel fraction of a flame-retardant resin-formed article comprising a photopolymerizable composition in which nano-size flame-retardant particles of the Examples are blended is in a range of 72 to 85%, and this is approximately equivalent to a gel fraction 78% of a sample not containing a frame-retardant of Comparative Example 1. On the other hand, a composition using magnesium hydroxide of a particle diameter of 800 nm of Comparative Examples 2 and 3 is barely cured. In addition, it is seen that flame retardancy can be improved in the Examples as compared with Comparative Examples.

What is claimed is:

1. A photopolymerizable composition comprising:
   flame-retardant particles which have an average diameter of about 1 to 500 nm and contain a hydrated metal; and
   a photopolymerization reactive material.

2. A photopolymerizable composition according to claim 1, wherein the hydrated metal includes at least one selected from the group consisting of a hydrated magnesium, hydrated calcium, hydrated aluminum, hydrated zinc, hydrated barium, hydrated copper and hydrated nickel.

3. A photopolymerizable composition according to claim 1, wherein a cover layer which contains an organic compound or a polysilicone is formed on surfaces of the flame-retardant particles.

4. A photopolymerizable composition according to claim 1, wherein an amount of the flame-retardant particles which are contained in the photopolymerizable composition is in a range of about 1 to 100 parts by mass relative to 100 parts by mass of the photopolymerization reactive material.

5. A photopolymerizable composition according to claim 1, wherein the photopolymerization reactive material contains at least one selected from the group consisting of an urethane acrylate and an urethane methacrylate.

6. A photopolymerizable composition according to claim 1, which further contains a photopolymerization initiator.

7. A flame-retardant resin-formed article which is formed of a photopolymerizable composition comprising:
   flame-retardant particles which have an average diameter of about 1 to 500 nm and contain a hydrated metal; and
   a photopolymerization reactive material.

8. A flame-retardant resin-formed article according to claim 7, wherein the hydrated metal includes at least one selected from the group consisting of a hydrated magnesium, hydrated calcium, hydrated aluminum, hydrated zinc, hydrated barium, hydrated copper and hydrated nickel.

9. A flame-retardant resin-formed article according to claim 7, wherein a cover layer which contains an organic compound or a polysilicone is formed on surfaces of the flame-retardant particles.

10. A flame-retardant resin-formed article according to claim 7, wherein an amount of the flame-retardant particles which are contained in the photopolymerizable composition is in a range of about 1 to 100 parts by mass relative to 100 parts by mass of the photopolymerization reactive material.

11. A flame-retardant resin-formed article according to claim 7, wherein the photopolymerization reactive material contains at least one selected from the group consisting of an urethane acrylate and an urethane methacrylate.

12. A flame-retardant resin-formed article according to claim 7, which further contains a photopolymerization initiator.

13. A flame-retardant resin-formed article according to claim 7, wherein a flame retardancy of the article measured in accordance with the UL-94 test scores HB or higher.

14. A flame-retardant resin-formed article according to claim 7, wherein a gel fraction of the photopolymerized photopolymerizable composition is 70% or more.

* * * * *